US009110591B2

(12) United States Patent
Jenkins et al.

(10) Patent No.: US 9,110,591 B2
(45) Date of Patent: Aug. 18, 2015

(54) MEMORY RESOURCE PROVISIONING USING SAS ZONING

(75) Inventors: Aaron L. Jenkins, Tomball, TX (US); Paul Miller, Houston, TX (US); Balaji Natrajan, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 628 days.

(21) Appl. No.: 13/092,471

(22) Filed: Apr. 22, 2011

(65) Prior Publication Data
US 2012/0271996 A1    Oct. 25, 2012

(51) Int. Cl.
G06F 15/173 (2006.01)
G06F 3/06 (2006.01)
H04L 29/08 (2006.01)

(52) U.S. Cl.
CPC .............. *G06F 3/0604* (2013.01); *G06F 3/067* (2013.01); *G06F 3/0631* (2013.01); *G06F 3/0637* (2013.01); *G06F 3/0689* (2013.01); *H04L 67/1097* (2013.01)

(58) Field of Classification Search
USPC .................................................. 711/114, 173
See application file for complete search history.

(56) References Cited

U.S. PATENT DOCUMENTS

| | | | |
|---|---|---|---|
| 7,685,378 B2 | 3/2010 | Arakawa et al. | |
| 7,913,023 B2 | 3/2011 | Johnson et al. | |
| 2004/0078599 A1* | 4/2004 | Nahum | 713/201 |
| 2004/0088417 A1* | 5/2004 | Bober et al. | 709/227 |
| 2008/0155223 A1* | 6/2008 | Hiltgen et al. | 711/173 |
| 2009/0013213 A1 | 1/2009 | Kalman et al. | |
| 2009/0083423 A1* | 3/2009 | Basham et al. | 709/226 |
| 2009/0240809 A1 | 9/2009 | La Frese et al. | |
| 2009/0248953 A1 | 10/2009 | Satoyama et al. | |
| 2010/0064348 A1* | 3/2010 | Matsumoto et al. | 726/4 |
| 2010/0082931 A1 | 4/2010 | Hatfield | |
| 2010/0153638 A1 | 6/2010 | Yochai et al. | |
| 2011/0191537 A1* | 8/2011 | Kawaguchi et al. | 711/114 |
| 2012/0166724 A1* | 6/2012 | Smith | 711/114 |

OTHER PUBLICATIONS

Alex Leites, "How a SAS switch can improve storage management", Oct. 19, 2010.*
Mauri., "LSI Launches Industry's First 6Gb/s SAS Switch in the Channel", Retrieved from http://www.networkcomputing.com/print_entry.php?eid=87643, Published Oct. 12, 2010, 2 pages.

(Continued)

*Primary Examiner* — Aimee Li
*Assistant Examiner* — Trang Ta
(74) *Attorney, Agent, or Firm* — Brooks, Cameron & Huebsch, PLLC

(57) ABSTRACT

An example method for memory resource provisioning using SAS zoning can include a serial attached Small Computer System Interface (SCSI) (SAS) switch and a provisioning manager (PM) executing on the SAS switch. A plurality of servers are communicatively coupled to the SAS switch, each server executing an operating system (OS) having access to one or more OS volumes. A host provisioning agent (HPA) executes on the OS of each of the plurality of servers. A plurality of memory resources are communicatively coupled to the SAS switch. Each memory resource can have a number of physical hard drives. A first portion of the memory resources is associated with zone groups corresponding to the plurality of servers. A second portion of the memory resources is associated with a provisioning zone group (PZG) hidden from the plurality of servers but available to the PM.

13 Claims, 4 Drawing Sheets

(56) References Cited

OTHER PUBLICATIONS

Unknown., "EonStor DS Storage Solutions in Datacenters", Infortrend Technology, Inc., 10 pages.

Liao, et al., "Managing Access Control Through SAS Zoning", Sep. 2005, PMC-Sierra, Inc., Document No. PMC-2051469, Issue 1, pp. 1-19.

* cited by examiner

MEMORY RESOURCE PROVISIONING USING SAS ZONING

BACKGROUND

In enterprise data processing arrangements, information is often stored on servers and accessed by users over, for example, a network. The information may comprise any type of information, such as programs and/or data to be processed. Users are able to store and retrieve information to be processed on the remotely-located servers. Generally, servers store data in memory resources that can typically include a number of physical drives. Information can be stored in units, such as files. A file may be stored by a server on one physical drive, or alternatively portions of a file may be stored on several physical drives.

A server may service access requests from a number of users concurrently. It is generally desirable to store information in memory resources in such a manner that one physical drive unit is not heavily loaded, or busy servicing accesses, while others are lightly loaded or idle. To provide redundancy and increase performance, memory resources may be configured in a redundant array of independent disks (RAID) topology. An enterprise computing system may have memory resources that are located remote from one another and/or users thereof. Ensuring adequate memory resources are available to a computing system in a cost efficient and process effective manner is an ongoing consideration burdening computing system administrators.

DETAILED DESCRIPTION

Figure 1:
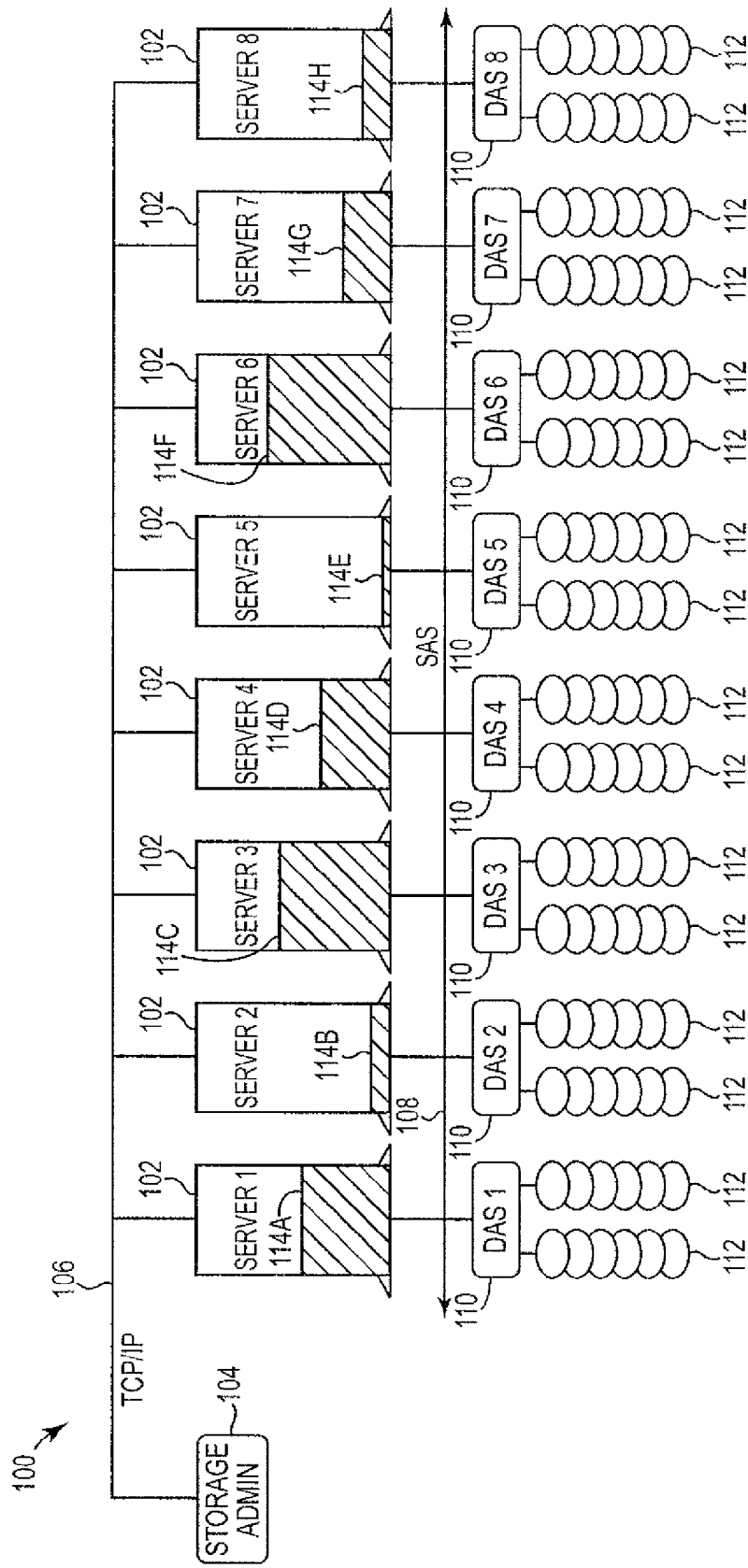
FIG. 1 illustrates a computing system having over-provisioned memory resources in a DAS configuration.

Embodiments of the present disclosure may include methods, systems, and computer readable media with executable instructions, and/or logic. An example method for memory resource provisioning using SAS zoning can include a serial attached Small Computer System Interface (SCSI) (SAS) switch and a provisioning manager (PM) executing on the SAS switch. A plurality of servers are communicatively coupled to the SAS switch, each server executing an operating system (OS) having access to one or more OS volumes. A host provisioning agent (HPA) executes on the OS of each of the plurality of servers. A plurality of memory resources are communicatively coupled to the SAS switch. Each memory resource can have a number of physical drives. A first portion of the memory resources is associated with zone groups corresponding to the plurality of servers. A second portion of the memory resources is associated with a provisioning zone group (PZG) hidden from the plurality of servers but available to the PM.

A server can be communicatively coupled to one or more memory resources. The memory resources can be, for example, an array of physical drives (e.g., hard disk drive, solid state drive). The physical drives of an array can be organized into one or more groups of physical drives. As used herein, hard disk drive (HDD) and hard drive (HD) are used interchangeably. A hard disk drive can include one or more disks. A solid state drive can include one or more physical sub-units. For simplicity and convenience in the following descriptions, a "disk" shall also refer to the physical sub-unit of a solid state drive. A memory resource storage enclosure can include a number of drive bays, each drive bay housing a physical drive.

An operating system (OS) executes on the server. The OS has access to one or more OS volumes. An OS volume refers to a quantity of virtual memory. The OS volume can be organized to include one or more logical drives (e.g., virtual drives). Information associated with an OS volume can be stored on one or more of the memory resources (e.g., physical drives).

An array of physical drives can be arranged into a redundant array of independent disks (RAID) controlled by an array controller, such as an HP Smart Array controller. A RAID can be used to divide and/or replicate information among multiple physical drives. Redundancy can be achieved by mirroring the same information on multiple physical drives of the RAID and/or storing different logical drives of an OS volume on different physical drives of the RAID. As such, the disks of the multiple physical drives are said to be in a RAID array, which can be addressed by an operating system as one single memory resource. A RAID, as used herein, can mean any of a number of different schemes and/or architectures used to increase data reliability and/or increase input/output performance.

New server installations are often over-provisioned with memory resources. That is, sufficient physical drive capacity may be installed to accommodate the full capacity of the logical drives. For example, a physical drive may be formatted to have two logical drives, each logical drive having a logical capacity of 70 GB. The physical drive may be initially provisioned to allot 70 GB of physical drive capacity to each of the two logical drives, thereby consuming 140 GB of physical drive capacity. However, if each logical drive initially is only storing 10 GB of data, then 60 GB of the physical drive capacity initially provisioned to each logical drive remains unused for information storage. Over-provisioning initially results in low physical drive utilization rates, which can be below thirty percent (30%), for example. The capital expenditure for equipment acquisition, and the operating expenses for power, cooling, storage management, and real estate costs of operating the unnecessary (e.g., over-provisioned) physical drives is initially greater than it has to be.

One previous approach is to manually monitor usage of memory resources and manually add additional memory resources (e.g., physical drives) as needed. However, such monitoring of usage and timely adding additional memory resources for individual servers can be administratively burdensome, requiring ongoing analysis and repeated justification for capital expenditure within constrained budget approval cycles. Such an incremental approach can also be cost prohibitive since efficiencies of scale are lost.

RAIDs used as memory resources for a server often utilize Small Computer System Interface (SCSI) physical drives. SCSI is a set of standards for physically connecting and transferring data between computers and peripheral devices, such as physical drives. Traditional SCSI involved parallel communications (e.g., a SCSI Parallel Interface (SPI)). Serial Attached SCSI (SAS) performs data transfer via serial communications. SAS uses a modified Serial Advanced Technology Attachment (SATA) data and power cabling. Serial SCSI (e.g., SAS) has a number of advantages over parallel SCSI, such as faster data rates, hot swapping, and improved fault isolation. Serial SCSI also does not suffer from clock skew problems of high speed parallel interfaces related to cabling and termination. Some servers utilize SATA based RAID systems. Desktop computers and notebooks more typically use ATA/IDE (Advanced Technology Attachment/Integrated Drive Electronics) or SATA connections for internal physical drives, and USB, eSATA, and Firewire connections for external devices (e.g., external physical drives).

A physical drive can undergo a physical format to get it ready for operation, then a logical format to prepare it for use in the intended operating environment and to support the desired file structures. Logical formatting partitions (e.g., administratively divides) the physical drive into two or more logical drives, which are logically-separated "areas" of the physical drive. A logical drive appears to an operating system to be an independent physical drive. Disk images are substituted for disk reading hardware via a software disk emulator. Although logical drives can reside on a common physical drive, and information stored on the various logical drives is physically stored on the same physical drive, respective operating systems can only access the logical drives with which the respective operating system is associated.

A logical drive can be extended to provide additional virtual storage if the extension will occur using already available virtual capacity within an OS volume. An OS volume can be extended to provide additional virtual capacity if the extension will occur within already available physical drive capacity on an original physical drive or onto available physical drive capacity on other physical drive(s) of the array. However, if insufficient physical drive capacity is not available, additional physical drive capacity can be added to an array (e.g., RAID) by adding additional memory resources (e.g., physical drives). As an additional physical drive is added to the memory resources associated with a server, the array can be expanded to include the additional physical drive. Once the array is expanded, an OS volume and/or a logical drive can be extended to include some portion of the additional physical drive capacity.

Serial attached SCSI (SAS) is can be used in small storage area network (SAN) server environments. SAS is a mechanism for connecting large groups of targets (e.g., computing devices, memory resources, peripherals) in a small SAN in cluster or blade server environments, allowing these servers to share resources across their targets. SAS usage in certain SAN server environments can benefit from segregation and management of device traffic. SAS zoning can meet zoning and access control needs. SAS zoning provides functionality for traffic segregation, resource flexibility, controlled resource sharing, topology control, and protection against unauthorized access. SAS zoning enables the management of SAS-based blade servers, which support both enterprise-class applications with SAS hard disk drives (HOD) and near-line/fixed content storage requirements with SATA HDDs.

SAS offers many benefits for enterprise information technology (IT) infrastructures which need to operate leanly and with high productivity and flexibility. SAS is a point-to-point protocol that is a high performance, scalable, flexible, and economical solution for deploying memory resources. SAS is a replacement for parallel SCSI, maximizing the ease with which information storage capacity and throughput is created. Its target application is direct attached storage (DAS) systems where one server is connected to multiple physical drives. However, SAS also provides a powerful switching capability using expanders, which act as switches to end devices, enabling quick aggregation of many physical drives in a single SAS domain. These expanders are fully capable of connecting multiple servers to multiple targets.

FIG. 1 illustrates a computing system having over-provisioned memory resources in a DAS configuration. FIG. 1 shows a computing system 100 networked to include a plurality of servers 102 communicatively coupled to a storage administrator 104 via a communication link 106. Communication link 106 may utilize Transmission Control Protocol/Internet Protocol (TCP/IP). Each server 102 is communicatively coupled to dedicated memory resources arranged in a direct-attached storage (DAS) configuration 110 via a SAS interface 108. Each DAS 110 includes a number of physical drives 112.

A respective operating system (OS) executes on each server 102. Each OS has access to a quantity of virtual memory (e.g., an OS volume). For example, each OS may be allocated a quantity of virtual memory. However, only a portion of the virtual memory of each server 102 is being utilized at any given time to store information. The portion of the virtual memory of each server 102 that is presently being utilized to store information is indicated in FIG. 1 by the levels shown within each server 102, e.g., 114A, 114B, . . . , 114H, where shading occupying an entire volume of a server 112 corresponds to 100% of the virtual memory of a server being utilized to store information. The portion of the virtual memory of each server that is presently being utilized to store information varies from server to server, as indicated by the varying levels 114A, 114B, . . . , 114H shown in FIG. 1.

FIG. 1 is intended to show that each server is over-provisioned with memory resources (e.g., physical drives 112). That is, each server 102 is shown having sufficient physical drive capacity installed to accommodate the full capacity of the virtual memory associated with each respective server. Since the portion of the virtual memory of each server that is presently being utilized to store information is shown being less than 100% for each server, the physical drives capacity for each server is being underutilized. The amount of physical drive underutilization varies from server to server inverse to the portion of virtual memory capacity being utilized for each respective server. For example, server 5 has a least utilization of virtual memory to store information, which can correspond to a greatest underutilization of the dedicated memory resources corresponding to server 5 (i.e., physical drives of DAS 5).

Figure 2:
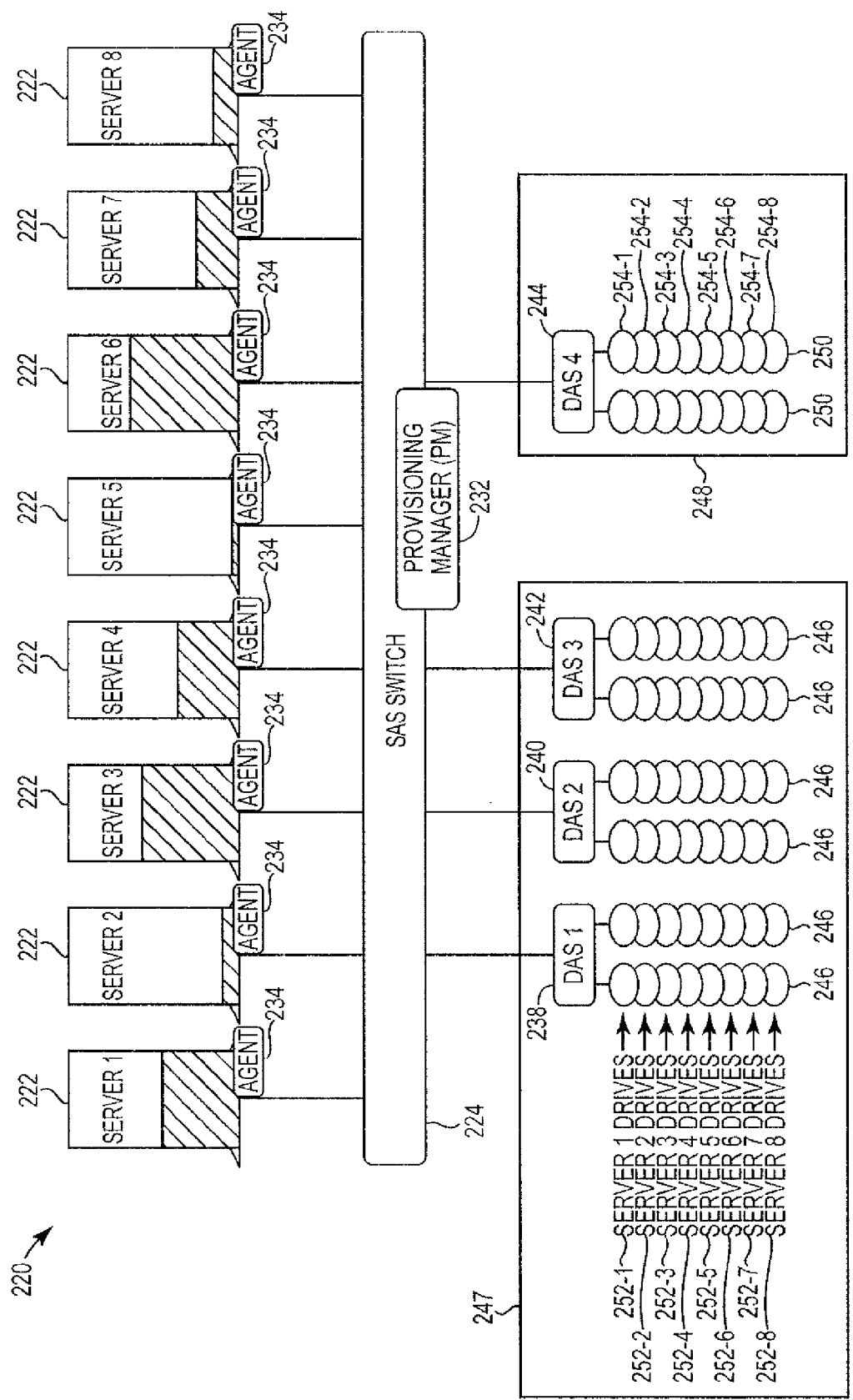
FIG. 2 illustrates an example storage system with storage provisioning using SAS zoning according to the present disclosure.

FIG. 2 illustrates an example storage system with storage provisioning using SAS zoning according to the present disclosure. According to a number of examples of the present disclosure, Serial Attached SCSI (SAS) Zoning is used to provide a provisioning approach in a Direct Attached Storage (DAS) environment. FIG. 2 shows a computing system 220 networked to include a plurality of servers 222 and a plurality of memory resources (e.g., 238, 240, 242, 244) communicatively coupled to a serial attached Small Computer System Interface (SCSI) (SAS) switch 224. The memory resources, 238, 240, 242, 244, can be arranged in one or more arrays, such as a RAID, controlled by an array controller, such as an HP Smart Array controller. The memory resources, 238, 240, 242, 244, can be direct-attached storage (DAS) devices. Each memory resource, 238, 240, 242, 244, can include a number of physical drives 246.

The number of physical drives 246 of a memory resource, 238, 240, 242, 244, can be associated with respective servers. For example, some number of physical drives 246 of memory resource 238 can be utilized as server 1 drives 252-1, some number of physical drives 246 of memory resource 238 can be utilized as server 2 drives 252-2, some number of physical drives 246 of memory resource 238 can be utilized as server 3 drives 252-3, some number of physical drives 246 of memory resource 238 can be utilized as server 4 drives 252-4, some number of physical drives 246 of memory resource 238 can be utilized as server 5 drives 252-5, some number of physical drives 246 of memory resource 238 can be utilized as server 6 drives 252-6, some number of physical drives 246 of memory resource 238 can be utilized as server 7 drives 252-7, some number of physical drives 246 of memory resource 238 can be utilized as server 8 drives 252-8, and so on. Likewise, the physical drives of other memory resources, e.g., 240, 242, can be designated for utilization with a particular server. In this manner, the physical drives utilized for a particular server can be disbursed across a number of memory resources to divide and replicate information among multiple physical drives.

A respective operating system (OS) executes on each server 222, each OS having access to a quantity of virtual memory (e.g., one or more OS volumes). The OS volumes may be organized in a RAID. Each OS volume may be configured, for instance, to create a number of memory partitions so as to allocate portions of the virtual memory associated with the OS volume. The OS volumes may be configured physically and/or virtually (i.e., logically), including creation of one or more logical drives. However, only a portion of the virtual memory available to each respective server 222 may presently be utilized to store information. For example, the portion of the virtual memory of each server 222 that may presently be utilized to store information at a given time is indicated in FIG. 2 by the levels shown within each server 222, similar to the levels 114A, 114B, . . . , 114H, shown in FIG. 1 (where shading occupying an entire volume of a server 222 corresponds to 100% of the virtual memory of a server being utilized to store information). The portion of the virtual memory of each server that is presently being utilized to store information can vary from server to server, and vary over time. Therefore, the quantity of physical drives needed to store the portion of the virtual memory of each server that is presently being utilized to store information can also vary from server to server, and vary over time.

Provisioning using SAS zoning, according to a number of examples of the present disclosure, operate using two software components, a Host Provisioning Agent (HPA) that executes on a respective server's operating system, and a Provisioning Manager (PM) that executes on a SAS switch. The agent monitors storage utilization of operating system (OS) volumes that can be re-provisioned. When the utilization of a monitored volume exceeds a defined threshold, the HPA can request more physical information storage capacity from the PM. In response to the agent's request, the PM can allocate more physical information storage capacity to the server by adding one or more physical drives to the zone group configured for the server's array controller.

According to an alternative embodiment, a storage administrator can be communicatively coupled to the SAS switch 224 via a communication link, and the PM can execute on the storage administrator. The storage administrator can be, for example, a separate server communicatively coupled to the SAS switch 224 and/or a SAS fabric. The communication link may utilize Transmission Control Protocol/Internet Protocol (TCP/IP). For configurations where the PM 232 resides on a separate server, the PM 232 can be assigned to the separate server using, for example, SAS-2 zoning commands.

The memory resources, 238, 240, 242, 244, can be administratively segregated into various groups. According to some examples, a first portion of the memory resources (e.g., 238, 240, and 242) can be associated with one or more zone groups 247 corresponding to the plurality of servers, and a second portion of the memory resources (e.g., 244) can be associated with one or more provisioning zone groups (PZG) 248 hidden from the plurality of servers 222 but available only to the PM 232. The PZG 248 can be a provisioning pool of physical drives 246 that have been dedicated for the purpose of having additional physical drives 246 available for automated addition of physical information storage capacity to the servers 222.

According to a number of examples, the PZG 248 can contain one or more physical drives that can be used to re-provision server 222 arrays. The physical drives 250 and/or disks present in the drive bays of memory resource storage enclosure(s) associated with the PZG 248 are candidates for a re-provisioning operation. The one or more physical drives 250 of the PZG 248 can include physical drives having different characteristics, such as physical drive size, physical drive type, and physical drive speed (e.g., access speed), among others.

For instance, the physical drives of DAS 4 may include physical drives compatible with server 1 at 254-1, physical drives compatible with server 2 at 254-2, physical drives compatible with server 3 at 254-3, physical drives compatible with server 4 at 254-4, physical drives compatible with server 5 at 254-5, physical drives compatible with server 6 at 254-6, physical drives compatible with server 7 at 254-7, and physical drives compatible with server 8 at 254-8. The particular physical drive characteristics can be based on the attributes of the memory resources that may be needed by the plurality of servers 222 and their respective workloads, hardware compatibility, and other server-specific and enterprise information storage requirements. The PZG 248 can provide location independence for PM 232.

The memory resources within each of the zone groups (e.g., one or more zone groups 247 corresponding to the plurality of servers, one or more PZGs 248) can be further arranged into other groups, such as an array associated with a respective server. That is, the respective zone groups need not be the only groups to which a particular memory resource is associated, including but not limited to, server-specific arrays and/or groups that are geographically different from one another to achieve further division and replication of information among multiple physical drive locations, for example.

Figure 4:
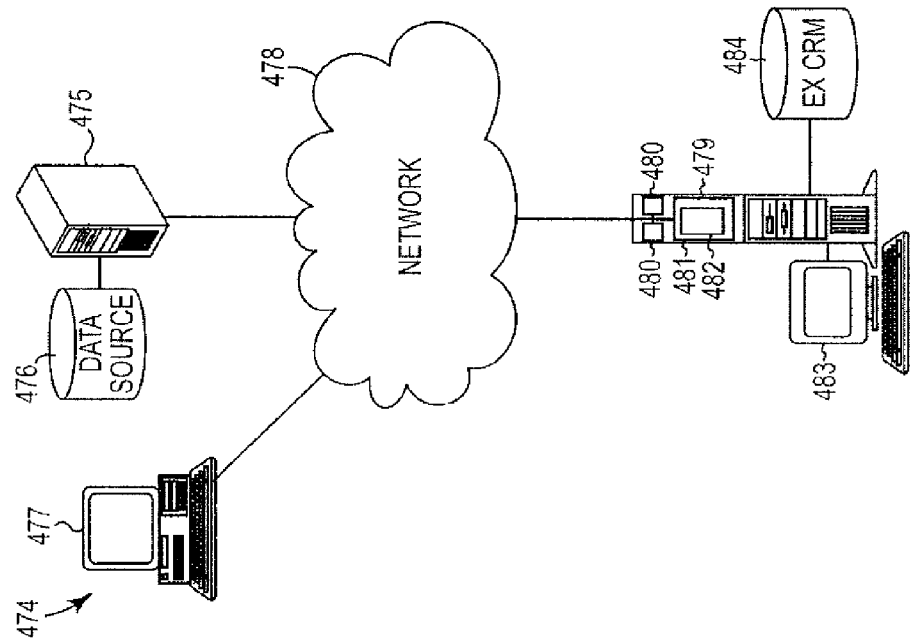
FIG. 4 illustrates a block diagram of an example client-server computing system having memory resource provisioning using SAS zoning according to the present disclosure.

The plurality of servers 222 shown in FIG. 2 may be further connected to one or more networks, and thereby be communicatively coupled to one or more clients, as described further with respect to FIG. 4. As memory resource needs increase, such as by existing clients storing more information, new clients being added, or other reasons, more virtual storage capacity may be added to existing OS volumes and/or new OS volumes. A particular server 222 can service all requests for access to OS volumes corresponding to the particular server 222. Consequently, the workload on the particular server 222 can increase and/or performance can decline.

The HPA 234 of each of the plurality of servers 222 monitors usage of the virtual memory capacity associated with a respective server. For example, an HPA 234 can determine utilization volume of one or more logical drives, including determining that utilization volume of a logical drive exceeds a threshold. The threshold for a logical drive can be set, for instance, at some margin before the virtual memory capacity associated with that logical drive is exceeded. The margin can be sized to allow enough time for additional physical memory capacity to be added to memory resources associated with the server, and the OS volume having the logical drive to be re-provisioned.

According to one or more embodiment of the present disclosure, the HPA 234 of the particular one of the plurality of servers 222 can request more physical information storage capacity from the PM 232. The request to the PM 232 from the HPA 234 can, for example, contain information about the current logical drive and array configuration (e.g., RAID, disk size, disk type, disk rpm).

Responsive to the HPA 234 request, the PM 232, which has access to the additional memory resources of the PZG 248, can add one or more physical drives 250 from the PZG 248 to a zone group 247 corresponding to the plurality of servers. The number of physical drives 250 added can depend on the configuration information of the array of memory resources and, optionally, on pre-defined administrative expansion policies. More specifically, the PM 232 can evaluate the configuration information of the memory resources, including the memory resources associated with a server array and/or the PZG 248. The configuration information can include RAID level of the subject OS volume, physical hard drive disk size, physical hard drive disk type, and physical hard drive disk speed. The PM 232 can evaluate the configuration information to determine physical hard drives 250 to add that are compatible with the array controlled by the server's 222 array controller.

The PM 232 can scan a list of candidate installed physical drives 250 in the PZG 248 to find a set of disks of a physical drive 250 that are compatible with the existing array. A match results in the PM 232 logically removing drive bays from the PZG 244 and logically assigning them to a zone group 247 accessible by the subject server. The entire re-provisioning process can be fully automated. During the initial installation, administrative re-provisioning policies are configured in the PM 232. The PM 232 can be written to provide intelligent default policies based on the attached hardware.

The PM 232 can be configured to send an electronic notification (e.g., text message, e-mail) to a system administrator when re-provisioning events occur and/or when the number of physical drives 250 in the PZG 248 falls below a configured quantity threshold, among other events. In this manner, the effort required to monitor physical information storage capacity utilization is reduced. New memory resource storage enclosures can be added without system downtime due to hot plug nature of the SAS fabric. Additional physical drives can be added to the PZG 248 periodically according to the aggregate demand for memory resources across the plurality of servers 222.

The PM 232 can indicate to the HPA 234 the completion of the addition of the one or more physical drives 250 to the zone group 247 corresponding to the plurality of servers 222. Responsive to the indicated completion of the addition of the one or more physical drives 250 to the zone group 247 corresponding to the plurality of servers 222, the HPA 234 can send a command to an array controller of a particular server to begin a logical drive expansion followed by a logical drive extension. The HPA 234 can monitor the logical drive expansion and logical drive extension, and, if required by the corresponding OS, notify the OS upon completion of the logical drive expansion and logical drive extension so that the file system can be updated. The OS can then update a file system on the extended logical drive (e.g., the logical drive that had the utilization volume that exceeded the threshold).

All of the operations for provisioning using SAS-based zoning can also be executed in a non-automated fashion using existing hardware and software components. The SAS switch 224 can be used to assign physical drives 250 to individual attached servers 222 using a management console. A array controller can expand a drive array and extend its logical volume using an array configuration utility, for example. An OS volume (e.g., logical volume of a file system) can be resized in a host OS using a disk management utility and/or a logical volume manager. The host OS can remain online during the entire process and the new capacity of the logical drive can become available to applications without interruption or downtime. The solution of the present disclosure leverages advanced features that can be present in the firmware for array host bus adaptors (HBAs) and a SAS switch 224.

Figure 3:
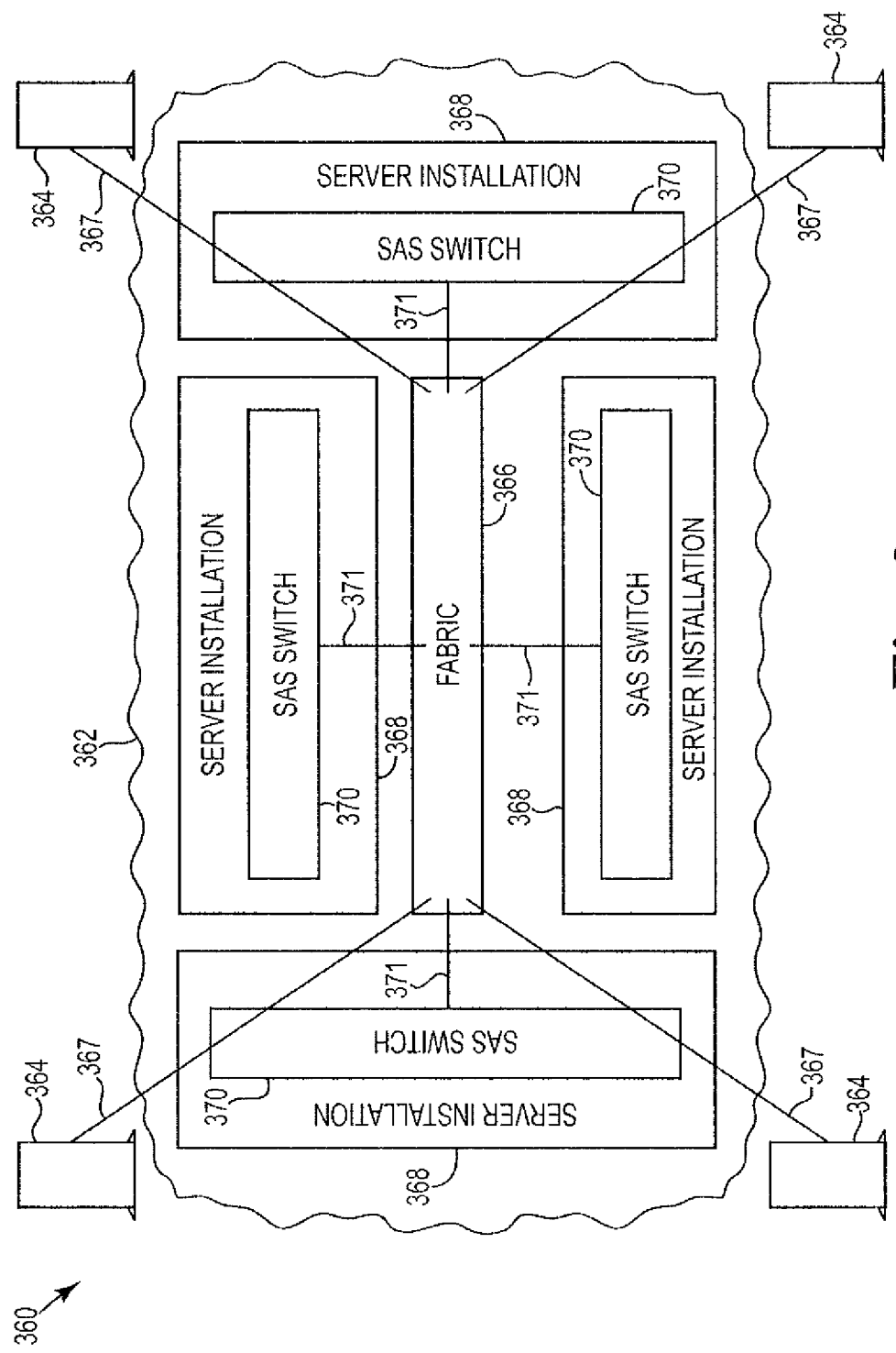
FIG. 3 shows an example of a SAS switch infrastructure according to the present disclosure.

FIG. 3 shows an example of a SAS switch infrastructure according to the present disclosure. According to various examples, a SAS switch 224, such as is shown in FIG. 2, can be implemented as the SAS switch infrastructure 362 shown in FIG. 3. The SAS switch infrastructure 362 can be designed to significantly extend the capabilities of SAS in direct-attached storage (DAS) environments by allowing multiple servers to connect to one or more independent external memory resources. A SAS switch infrastructure 362 can provide a high-performance, low-cost, and easy-to-use storage networking option for rack-mount server and storage installations in cloud computing, data center, and managed hosting application environments.

The SAS switch infrastructure 362 can help to optimize memory resource utilization, reduce islands of memory resources, and simplify memory resource management, backup, and upgrades by enabling memory resources to be shared across multiple servers and managed effectively through SAS zoning. The SAS switch infrastructure 362 can also be designed to provide the connectivity necessary to support virtual server environments, allowing entities to realize the benefits of virtual machine migration while maintaining the management simplicity of DAS. A single SAS switch infrastructure 362 can address multiple classes of storage, enabling tiered-storage solutions through a mix of SATA and SAS memory resource devices.

FIG. 3 shows an example of a computing system 360 having a number of servers 364 communicatively coupled to a SAS switch infrastructure 362 via corresponding communication links 367. The SAS switch infrastructure 362 shown in FIG. 3 has a zoning fabric 366, to implement storage provisioning using a SAS zoning. According to some examples, the SAS switch infrastructure 362 can be a SAS-2 zoning service delivery system. The SAS-2 zoning service delivery system can differ from a legacy SAS 1.1 service delivery system in that it consists of a number of zoning expanders 368. Zoning expanders 368 are capable of configuring various zones and implementing and enforcing access control policies on a network. The servers 364, which are communicatively coupled to the zoning expanders 368 via the communication links 367 and zoning fabric 366, can be legacy computing devices (including expanders).

The zoning expanders 368 can be implemented as a server installation executing a SAS switch application 370. The zoning expanders 368 can be communicatively coupled to the zoning fabric 366 via a communication path 371. The zoning expanders 368 that are attached to the edge of the zoning fabric 366 can inherit the zone membership of their attachment point, at the boundary of the zoning service delivery system. Since a zoning function is fully implemented by an expander fabric, the implementation is completely transparent to the servers and other end computing devices, including legacy devices such as SAS 1.1 HBAs and physical drives that do not have knowledge of zoning. Therefore, servers need not change their behavior.

FIG. 4 illustrates a block diagram of an example client-server computing system having memory resource provisioning using SAS zoning according to the present disclosure. FIG. 4 illustrates a block diagram of an example of a computing system (e.g., server) used in a storage provisioning using SAS zoning according to the present disclosure. The computing system 474 can be comprised of a number of computing resources communicatively coupled to the network 478. FIG. 4 shows a first computing device 475 that may also have an associated data source 476, and may have one or more input/output devices (e.g., keyboard, electronic display). A second computing device 479 is also shown in FIG. 3 being communicatively coupled to the network 478, such that executable instructions may be communicated through the network between the first and second computing devices.

Second computing device 479 may include one or more processors 480 communicatively coupled to a non-transitory computer-readable medium 481. The non-transitory computer-readable medium 481 may be structured to store executable instructions 482 (e.g., one or more programs) that can be executed by the one or more processors 480 and/or data. The second computing device 479 may be further communicatively coupled to a production device 483 (e.g., electronic display, printer, etc.). Second computing device 479 can also be communicatively coupled to an external computer-readable memory 484. The second computing device 479 can cause an output to the production device 483, for example, as a result of executing instructions of one or more programs stored on non-transitory computer-readable medium 481, by the at least one processor 480, to implement a system for memory resource provisioning using SAS zoning according to the present disclosure. Causing an output can include, but is not limited to, displaying text and images to an electronic display and/or printing text and images to a tangible medium (e.g., paper). Executable instructions to provision memory resources using SAS zoning may be executed by the first 475 and/or second 479 computing device, stored in a database such as may be maintained in external computer-readable memory 484, output to production device 483, and/or printed to a tangible medium.

One or more additional computers 477 may also be communicatively coupled to the network 478 via a communication link that includes a wired and/or wireless portion. The computing system can be comprised of additional multiple interconnected computing devices, such as server devices and/or clients. Each computing device can include control circuitry such as a processor, a state machine, application specific integrated circuit (ASIC), controller, and/or similar machine.

The control circuitry can have a structure that provides a given functionality, and/or execute computer-readable instructions that are stored on a non-transitory computer-readable medium (e.g., 476, 481, 484). The non-transitory computer-readable medium can be integral (e.g., 481), or communicatively coupled (e.g., 476, 484) to the respective computing device (e.g. 475, 479) in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium 330 can have computer-readable instructions stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium can include optical discs, digital video discs (DVD), Blu-ray discs, compact discs (CD), laser discs, and magnetic media such as tape drives, floppy discs, and hard drives, solid state media such as flash memory, EEPROM, phase change random access memory (PCRAM), as well as other types of machine-readable media.

According to a number of examples, first computing device 475 can correspond to server 222 shown in FIG. 2, and SAS switch 224 (having a PM 232 executing thereon) can be implemented by second 479 computing device. One or more additional computers 477 can be clients of first computing device 475. Clients are devices connected to the network that share services or other resources. A server (e.g., 475) can provide and administer these services and/or resources to clients (e.g., 477). Services and/or resources that may be provided and/or administered by a particular server (e.g., 475) can include access to memory resources, applications, and/or peripheral device sharing, among others.

Figure 5:
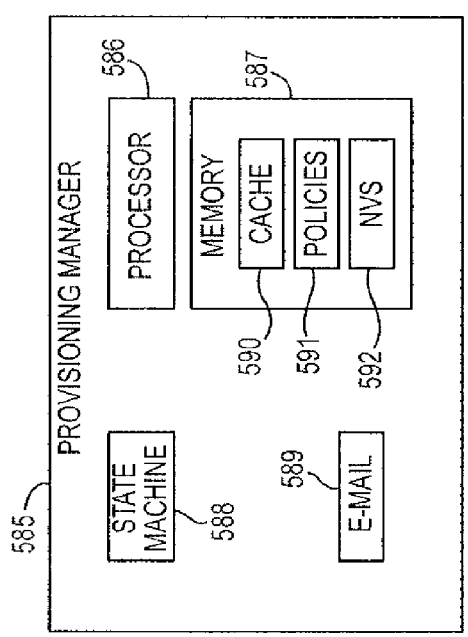
FIG. 5 illustrates an example provisioning manager according to the present disclosure.

FIG. 5 illustrates a provisioning manager (PM) according to the present disclosure. An ability to effectively allocate storage in a DAS environment in a manner that provides for adequate data protection and recoverability is of particular importance. Because multiple servers may have access to a particular storage array in a DAS environment, prevention of unauthorized and/or untimely data access is desirable. Zoning, as described above with respect to FIG. 2, is an example of one technique that can be used to accomplish this goal. Zoning allows resources to be partitioned and managed in a controlled manner. A PM 585 may be used to map servers to memory resources, and provide control of allocation of physical drives.

According to various examples, PM 232 shown in FIG. 2 can correspond to PM 585. As previously described with respect to PM 232, PM 585 may be configured to aid in the selection of physical drives within a network of memory resources. PM 585 can include a storage virtualization optimizer that, according to an embodiment of the present invention, processes input/output in accordance with specified performance and space requirements, attributes of a computing workload, and the varying performance attributes of physical drives.

PM 585 can satisfy requests for additional information storage capacity in such a way as to meet the performance requirements specified with the request and/or through an administrative information storage policy mechanism. PM 585 can determine performance characteristics of managed physical drives and/or component disks. PM 585 can further determine relationships between managed physical drives and/or component disks and/or other memory resource groups based on user defined and/or automated input, taking into consideration the various memory resource groups considerations such as cache and data paths, to which physical drives may be allocated.

PM 585 is shown in FIG. 5 including a memory 587 and a processor 586. Processor 586 may execute instructions to perform various techniques as are described in this disclosure. The executable instructions to implement these techniques may be stored in memory 587. Memory 587 can include a cache 590, non-volatile storage (NVS) 592, and other segments for storing executable instructions such as administrative information storage policies.

PM 585 can also include a state machine 588 that may be operational as an administrator, or other functionality. State machine 588 may be implemented using a variety of mechanisms, such as hardware, firmware, software, or a combination thereof. PM 585 can further include an e-mail application 589, such as was previously described for notifying a system administrator.

Figure 6:
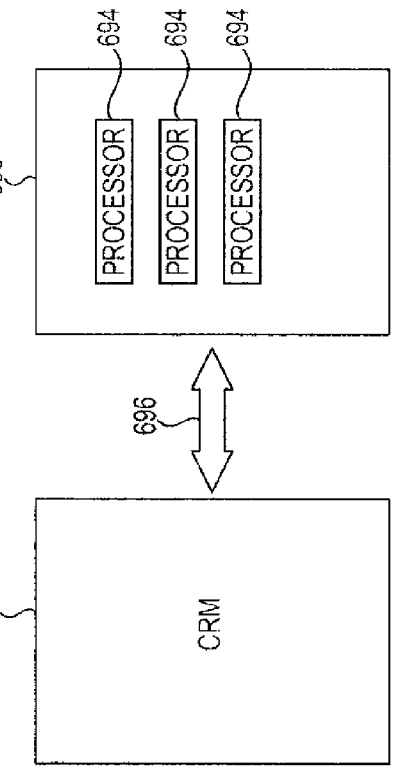
FIG. 6 illustrates a block diagram of an example computer readable medium (CRM) in communication with processing resources according to the present disclosure.

FIG. 6 illustrates a block diagram of an example of a computer readable medium (CRM) in communication with processing resources according to the present disclosure. FIG. 6 illustrates a block diagram of an example of a computer readable medium (CRM) 695 in communication with processing resources 693 according to the present disclosure. As used herein, processor resources 693 can include one or a plurality of processors 694 such as in a parallel processing arrangement. A computing device having processor resources can be in communication with, and/or receive a tangible non-transitory computer readable medium (CRM) 695 storing a set of computer readable instructions (e.g., software) for capturing and/or replaying network traffic, as described herein.

The non-transitory computer-readable medium can be integral, or communicatively coupled, to a computing device, in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium can have computer-readable instructions stored thereon that are executed by the processing resources (e.g., control circuitry, processor(s)) to provide a particular functionality.

The CRM 695 can be in communication with the processing resources 693 via a communication path 696. The communication path 696 can be local or remote to a machine associated with the processing resources 693. Examples of a local communication path 696 can include an electronic bus internal to a machine such as a computer where the CRM 695 is one of volatile, non-volatile, fixed, and/or removable storage medium in communication with the processing resources 693 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path 696 can be such that the CRM 695 is remote from the processing resources 693 such as in the example of a network connection between the CRM 695 and the processing resources 693 (e.g., the communication path 696 can be a network connection). Examples of such a network connection can include a local area network (LAN), a wide area network (WAN), a personal area network (PAN), the Internet, among others. In such examples, the CRM 695 may be associated with a first computing device (e.g., a server) and the processing resources 693 may be associated with a second computing device (e.g., a client). The first and second computers can be in communication via a networked communication path 696.

Logic can be used to implement the method(s) of the present disclosure, in whole or part. Logic can be implemented using appropriately configured hardware and/or software. The above-mention logic portions may be discretely implemented and/or implemented in a common arrangement.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples provided herein. The above description has been made in an illustrative fashion, and not a restrictive one. Combination of the above is examples, and other examples not specifically described herein will be apparent upon reviewing the above description. Therefore, the scope of one or more examples of the present disclosure should be determined with reference to the appended claims, along with the full range of equivalents to which such claims are entitled.

Throughout the specification and claims, the meanings identified below do not necessarily limit the terms, but merely provide illustrative examples for the terms. The meaning of "a," "an," and "the" includes plural reference, and the meaning of "in" includes "in" and "on." "Embodiment," as used herein, does not necessarily refer to the same embodiment, although it may.

In the foregoing discussion of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of this disclosure.

Some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for memory resource provisioning using serial attached Small Computer System Interface (SCSI) zoning, comprising:
    a Serial Attached SCSI (SAS) switch, the SAS switch communicatively coupled to a storage administrator executing a provisioning manager (PM);
    a plurality of servers communicatively coupled to the SAS switch, each server executing:
        an operating system (OS) having access to one or more OS volumes;
        a host provisioning agent (HPA) on top of the OS; and
    a plurality of memory resources communicatively coupled to the SAS switch, each memory resource having a number of physical hard drives, wherein:
  a first portion of the memory resources is associated with zone groups corresponding to the plurality of servers and a second portion of the memory resources is associated with a provisioning zone group (PZG) hidden from the plurality of servers but available to the PM for allocation to the zone groups responsive to an HPA request;
  a quantity of physical hard drives allocated to a zone group corresponding to a server among the plurality of servers is based on information about an OS volume among the one or more OS volumes exceeding a pre-defined threshold and configuration information of an array controlled by the server's array controller;
  the configuration information of the array includes RAID level, physical drive size, physical drive type, and physical drive speed; and
  the allocated physical hard drives are compatible with the array controlled by the server's array controller.

2. The system of claim 1, wherein the memory resources are Direct Attached Storage (DAS) devices and the PZG is a provisioning pool of physical drives having different characteristics including physical drive size, physical drive type, and physical drive access speed.

3. The system of claim 1, wherein each HPA operates to monitor storage utilization of OS volumes that can be re-provisioned associated with a respective server, and request more physical information storage capacity via the PM when the storage utilization of a particular OS volume exceeds a pre-defined threshold.

4. The system of claim 1, wherein the PM operates to allocate more physical information storage capacity to a particular server responsive to a request for more physical information storage capacity by an HPA executing on the OS of the server by adding one or more physical hard drives from the PZG to a zone group corresponding to the plurality of servers.

5. The system of claim 1, wherein the PM operates to allocate more physical information storage capacity to a zone group corresponding to a server responsive to a request for more physical information storage capacity by an HPA executing on the OS of the server by adding one or more physical hard drives from the PZG to the zone group configured for the server's array controller.

6. The system of claim 1, wherein the SAS switch is implemented as a SAS switch infrastructure including a zoning fabric communicatively coupled to a number of zoning expanders executing a SAS switch application.

7. A method for memory resource provisioning using serial attached Small Computer System Interface (SCSI) zoning, comprising:
  executing a provisioning manager (PM) on a storage administrator communicatively coupled to a Serial Attached SCSI (SAS) switch, the SAS switch having a plurality of servers and a plurality of Direct Attached Storage (DAS) devices communicatively coupled thereto, each DAS device having a number of physical hard drives;
  associating a first portion of the DAS devices with zone groups corresponding to the plurality of servers;
  associating a second portion of the DAS devices with a provisioning zone group (PZG), the PZG being hidden from the plurality of servers but available to the PM for allocating from the second portion of the DAS devices to the first portion of the DAS devices;
  executing a host provisioning agent (HPA) on top of an operating system (OS) of each of the plurality of servers having access to one or more OS volumes;
  requesting, by the HPA of the particular one of the plurality of servers, more physical information storage capacity from the PM executing on the storage administrator; and
wherein:
  a quantity of physical hard drives allocated to a zone group corresponding to a server among the plurality of servers is based on information about a number of OS volumes among the one or more OS volumes exceeding a pre-defined threshold and configuration information of an array controlled by the server's array controller;
  the configuration information of the array includes RAID level, physical drive size, physical drive type, and physical drive speed; and
  the allocated physical hard drives are compatible with the array controlled by the server's array controller.

8. The method of claim 7, further comprising:
  adding one or more physical drives from the PZG to a zone group corresponding to the plurality of servers;
  indicating to the HPA completion of the addition of the one or more physical drives to the zone group corresponding to the plurality of servers; and
  sending a command from the HPA to an array controller to begin a logical drive expansion followed by a logical drive extension responsive to the indication completion of the addition of the one or more physical drives to the zone group corresponding to the plurality of servers.

9. The method of claim 8, further comprising:
  monitoring, by the HPA, of the logical drive expansion and logical drive extension for completion thereof;
  notifying, by the HPA, the OS of the completion of the logical drive expansion and logical drive extension; and
  updating, by the OS, a file system on the logical drive that had the utilization volume that exceeded the threshold.

10. The method of claim 7, further comprising providing an electronic notification to a system administrator when re-provisioning events occur and/or when a quantity of physical drives associated with the PZG falls below a threshold quantity.

11. The method of claim 7, further comprising administratively controlling a quantity of physical hard drives added to the zone group corresponding to the plurality of servers pursuant to automated expansion policies.

12. A non-transitory computer-readable medium having computer-readable instructions stored thereon that, if executed by one or more processors, cause the one or more processors to:
  execute a provisioning manager (PM) on a storage administrator communicatively coupled to a serial attached Small Computer System Interface (SAS) switch having a plurality of servers and a plurality of Direct Attached Storage (DAS) devices communicatively coupled thereto, each DAS device having a number of physical hard drives;
  associate a first portion of the DAS devices with a zone group corresponding to the plurality of servers;
  associate a second portion of the DAS devices with a provisioning pool, the provisioning pool being hidden from the plurality of servers but available to the PM; and
  add, by the PM on the storage administrator, one or more of the number of physical drives to the first portion from the second portion responsive to a request from the plurality of servers, wherein:
    the number of physical drives added to the zone group from the provisioning pool is based on information about a number of OS volumes among the plurality of servers exceeding a pre-defined threshold and configuration information of an array controlled by the plurality of servers' array controller;

the configuration information of the array including RAID level, physical drive size, physical drive type, and physical drive speed; and the number of physical drives added to the zone group from the provisioning pool are compatible with the array controlled by the plurality of servers' array controller.

13. The non-transitory computer-readable medium of claim 12, further having computer-readable instructions stored thereon that, if executed by one or more processors, cause the one or more processors to perform a logical drive expansion followed by a logical drive extension responsive to:

execute a host provisioning agent (HPA) on top of an OS executing on each respective one of the plurality of servers;

determine, by an HPA of a particular one of the plurality of servers, utilization volume of virtual memory associated with an OS exceeds a threshold; and request, by the HPA of the particular one of the plurality of servers to the PM executing on the storage administrator, association of one or more physical drives associated with the provisioning pool to a zone group corresponding to the plurality of servers.

* * * * *